United States Patent
Wachter

[15] 3,680,825
[45] Aug. 1, 1972

[54] FIXTURE FOR USE IN THE FOAM INSULATION OF REFRIGERATOR CABINETS

[72] Inventor: Robert A. Wachter, Louisville, Ky.
[73] Assignee: General Electric Company
[22] Filed: Dec. 4, 1970
[21] Appl. No.: 95,024

[52] U.S. Cl. ............................... 249/83, 425/4
[51] Int. Cl. ............................... B22d 19/00
[58] Field of Search .......... 18/5 P, 45 R, DIG. 58, 44; 249/184, 185, 186, 144, 151, 152, 83; 425/4

[56] References Cited

UNITED STATES PATENTS 3,298,656  1/1967  Zastrow ................. 249/185 X
3,247,548  4/1966  Fields et al. ............. 18/DIG. 58

Primary Examiner—H. A. Kilby, Jr.
Attorney—Walter E. Rule, Francis H. Boos, Jr., Frank L. Neuhauser, Oscar B. Waddell and Joseph B. Forman

[57] ABSTRACT

A fixture for supporting the walls of the shell and liner components of a refrigerator cabinet during the foam insulation thereof includes a movable wall supporting member comprising a base plate and a plurality of removable and interchangeable elements secured to the base plate and adapted to collectively form a wall supporting surface conforming to the shape of the supported wall.

5 Claims, 3 Drawing Figures

PATENTED AUG 1 1972 3,680,825

INVENTOR
ROBERT A. WACHTER
BY Walter C. Kule
HIS ATTORNEY

FIXTURE FOR USE IN THE FOAM INSULATION OF REFRIGERATOR CABINETS

BACKGROUND OF THE INVENTION

A substantial number of modern household refrigerators include polyurethane plastic insulation foamed-in-place between the shell and liner components of the refrigerator cabinet. This insulation is formed by assembling the shell and liner in spaced relationship and introducing into the space between the shell and liner a foamable polyurethane resin which foams to completely fill the space prior to the solidification thereof. As the pressure generated by the foaming resin on the walls of the shell and liner are substantial, for example 5 pounds per square inch, it is necessary to back the relatively large flat walls of these components during the foam operation. Fixtures for this purpose have been so designed that their wall supporting surfaces exactly conform the size and shape of the shell and linear walls requiring support. In other words special fixtures had to be provided for the foaming of each cabinet model. Frequently a slight change in the shape of one of the cabinet components, usually the liner component, from one model year to another as for example the addition or removal of an indentation or projection on a liner wall has required considerably reworking of at least the liner supporting portion of a fixture before it could be used for foaming of the new model.

A primary object of the present invention is to provide an improved fixture for the foaming of a refrigerator cabinet or the like which can be quickly adapted for supporting cabinet components of different sizes and shapes.

Another object of the present invention is to provide a fixture adapted to accept several different refrigerator models, providing the necessary wall supporting function but eliminating the need for a costly reworking of the supporting surfaces.

SUMMARY OF THE INVENTION

In accordance with the illustrated embodiment of the present invention, there is provided a fixture for supporting the spaced shell and liner components of the cabinet during the formation of the foamed-in-place insulation between these components which includes a base for supporting the face portions of the shell and liner in a desired final spaced relationship and supporting structure for backing the walls of these components during the foaming operation. This supporting structure includes at least one backing member which is movable relative to the wall it supports from a normal supporting position to a position spaced from the wall. The movable backing member includes a base plate having the strength necessary to support the wall during the foaming insulation, the base plate being spaced from the wall when the backing member is in its normal position. The face of this base plate includes a plurality of removable or interchangeable spool-like elements secured to the base plate and collectively defining a supporting surface generally conforming to the shape of the supported wall.

BRIEF DESCRIPTION OF THE DRAWING

With reference to the accompanying drawing.

DESCRIPTION OF THE PREFERRED EMBODIMENT

Figure 1:
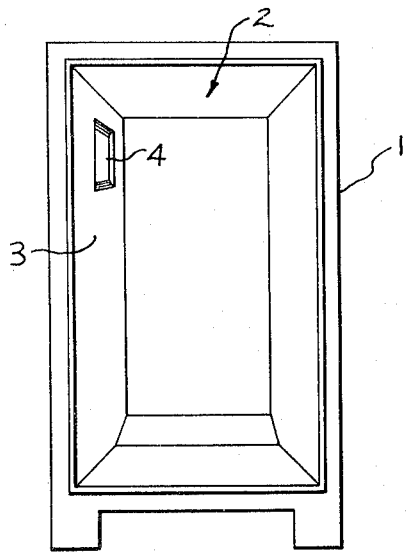
FIG. 1 is a front view of a refrigerator cabinet adapted to be foam insulated employing the fixture of the present invention.

While the present invention is not restricted thereto, it will be particularly described with reference to the manufacture of a refrigerator cabinet comprising a foamed-in-place insulation. A refrigerator cabinet typically comprises, as illustrated in FIG. 1 of the drawing, an outer shell 1 and a liner 2 which are spaced from one another, the space between these two components being filled with foamed polyurethane insulation. In the manufacture of such cabinets it is necessary to provide a suitable fixture for supporting the shell and liner in their final spaced relationship during the foaming operation and to support the relatively large flat surfaces thereof during the formation of the foam insulation.

In conventional fixtures of this type, the inner wall surfaces of the liner have been supported by a relatively large plug shaped to conform to the surfaces of the particularly liner being supported. While such fixtures have been completely satisfactory for supporting smooth wall liners having no protrusions or recesses which would interfere with the removal of the foamed cabinet from the plug, such fixtures have not been satisfactory for use with liners having irregular wall surfaces. For example, in the foaming of a cabinet such as that illustrated in FIG. 1 of the drawing in which one wall 3 of the liner 2 includes a recess 4 of substantial dimensions, any unitary plug shaped to support the bottom wall portion of this recess would prevent the subsequent removal of the liner from the plug.

In accordance with the present invention, there is provided a fixture in which the usual plug for supporting the liner is replaced by a plurality of liner backing members and in which at least the backing member or members supporting the liner wall or walls having either a projection or recess therein are movable between a normal supporting position and a second position to facilitate the separation of the liner from the fixture.

Figure 3:
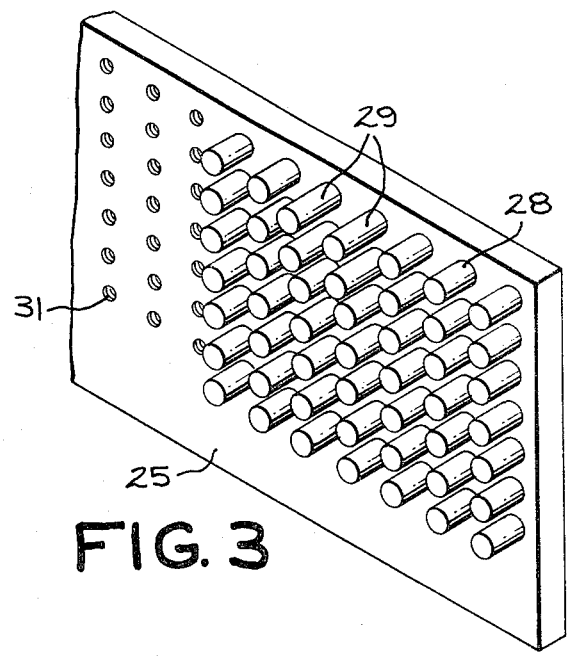
FIG. 3 is a perspective view of one of the backing members forming part of the fixture of FIG. 2.
Figure 2:
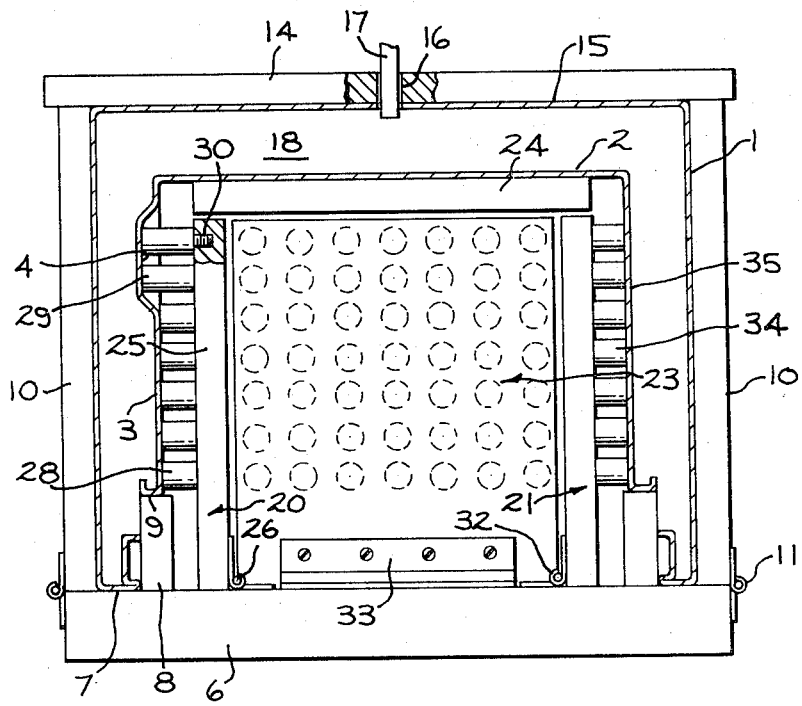
FIG. 2 is a somewhat schematic sectional view of the fixture of the present invention.

More specifically as illustrated in FIGS. 2 and 3 of the drawing, there is provided a fixture including a base 6 including an upper surface for supporting the front edges 7 of the shell. Positioning members 8 are provided on the base 6 for laterally positioning the shell 1 and also for supporting the forward edges 9 of the liner within and spaced from the forward portion of shell 1.

Since the illustrated refrigerator cabinet has flat rectangular outer wall surfaces, the portions of the fixture for supporting the shell walls are illustrated as being in the form of flat plates. More specifically, in FIG. 2 of the drawings, two of these plates indicated by the numeral 10 are provided for supporting the opposite side walls of the cabinet, it being understood that additional plates are also provided for supporting the outer top and bottom walls of the cabinet. Also, these plates are hingedly supported on the base 6 by hinges 11 so that they can pivot or move laterally as viewed in FIG. 2 relative to the shell 1 to facilitate positioning of the shell within the fixture and the removal of the foamed cabinet from the fixture. A flat top plate 14 which is, of course, removable is provided for supporting the rear wall 15 of the shell and this plate as well as the rear wall are provided with one or more openings 16 for the insertion of the nozzle 17 employed to introduce the foamable resin into the space 18 between the shell and liner.

In accordance with the present invention, the backing members for supporting the inner surfaces of the liner walls are also movable relative to these walls. In FIG. 2 of the drawing three of these backing members are shown, that is backing member 20 and 21 for supporting the side walls of the liner and a backing member 23 for supporting the bottom wall of the liner. In addition there is provided a backing member 24 for supporting the rear wall of the liner. If desired, this member may be supported by means (not shown) within the confines of the backing members 20, 21 and 23 and on the base 6.

Further in accordance with the present invention, at least some of the backing members for the liner walls are so constructed as to provide a backing surface adapted to support a liner wall having an irregular surface.

In the illustrated embodiment of the present invention, the backing member 20 is so constructed. More specifically, it comprises a backing plate 25 pivotally mounted by means of a hinge 26 on the base or support member 26 in spaced relationship with the adjacent liner wall 3. This space is bridged by means of a plurality of spool-like projections 28 and 29. These removable and interchangeable elements 28 and 29 may be secured to the plate 20 by bolts or, as shown in the drawing, may be provided with threaded shanks 30 adapted to be received in threaded openings 31 and the backing plate 25.

By providing interchangeable and removable elements of different lengths, the lengths of the elements may be so selected as to support a liner wall of any given configuration, irregularity, or shape. For example, in the illustrated embodiment of the invention, the shorter elements 28 support the relatively large plane surface of the wall 20 while the longer elements 29 extend into the recess or depression 4 to support the bottom wall thereof.

After the foaming operation and by operation of suitable operating mechanisms (not shown), the backing member 20 is pivoted about its hinge support 26 a distance sufficient to permit the longer elements 29 to clear all portions of the liner wall 3 so that the assembled liner and shell can then be lifted vertically from the fixture without interference from any portion of the mixture.

Preferably all of the liner supporting backing members are hingedly supported on the base 6 so that they can be pivoted inwardly to facilitate removal of the foamed cabinet. For example, the backing member 21 is hinged to the support 6 by means of a hinge structure 32 while the member 23 is similarly supported by a hinge 33.

Also for greater flexibility, all four of the liner backing members and if desired, also the backing members for the exterior side and end walls of the shell may be provided with elements similar to elements 28 and 29. By such construction, a given fixture can be employed for foaming a plurality of different cabinets of somewhat different sizes or cabinets of the same exterior dimensions, but having liners of different wall configurations. In the illustrated embodiment of the invention, the backing member 21 is illustrated as including a plurality of closely spaced elements 34 all of which are of the same length since the liner wall 35 supported thereby is flat.

The elements 28, 29 and 34 may be composed of any suitable material. Preferably, they are made from a plastic material such as Nylon which will provide adequate support for the finished liner walls without damaging the finish thereon. As it has been previously indicated, the lengths of the elements are selected to provide continuous support for irregularly shaped liner surfaces and when a model change results in a liner of somewhat different configuration, the spools are rearranged and selected to support the new liner.

It will thus be seen that the use of the interchangeable and removable elements to form the supporting surface eliminates the need for completely replacing the backing members as the results of a model change or the foaming of a cabinet of a slightly different shape or size.

While there has been shown and described a specific embodiment of the present invention, it will be understood that it is not limited thereto and it is intended by the appended claims to cover all such modifications that fall within the spirit and scope of the invention.

What is claimed is:

1. A fixture for supporting the spaced shell and liner components of a cabinet during the formation of a foamed-in-place insulation between said components comprising:

means for supporting the shell and liner in spaced relationship with the liner nested in said shell;

supporting structure for supporting the walls of said components during the foaming operation and including at least one backing member movable relative to the one wall supported thereby from a normal position supporting said one wall and a position spaced from said wall;

said backing member including a base plate spaced from said one wall when said backing member is in its normal position and a plurality of removable spool-like elements secured to base plate and of lengths collectively defining a supporting surface generally conforming to the shape of said one wall.

2. A fixture according to claim 1 in which said elements are composed of a plastic material.

3. A fixture for supporting the space shell and liner components of an insulated cabinet during the formation of a foamed-in-place insulation between said components comprising:

means including a base for supporting the face portions of the shell and liner with the liner nested in and spaced from said shell;

supporting structure for supporting the walls of said components during the foaming operation and including at least one backing member movable relative to the one wall supported thereby from a normal position supporting said one wall and a position spaced from said wall;

said backing member including a base plate spaced from said one wall when said backing member is in its normal position and removable spool-like elements secured to base plate and of lengths collectively defining a supporting surface generally conforming to the shape of said one wall.

4. A fixture according to claim 3 in which a plurality of said backing members are movable and include said removable elements.

5. A fixture according to claim 3 in which said elements are of different lengths.

* * * * *